United States Patent [19]
Tran et al.

[11] Patent Number: 6,094,403
[45] Date of Patent: Jul. 25, 2000

[54] COMBINED WRIST WATCH AND MEASURING TAPE

[76] Inventors: Long Dinh Tran; Anna Anh Tran, both of 8112 New Riggs Rd., Adelphi, Md. 20783

[21] Appl. No.: 09/182,106

[22] Filed: Oct. 28, 1998

[51] Int. Cl.[7] .............................. G04B 47/00; G01B 3/10

[52] U.S. Cl. ................................ 368/10; 368/278; 33/760

[58] Field of Search ............................. 368/10, 276, 278; 33/755–760, 766; D10/2, 31, 72

[56] References Cited

U.S. PATENT DOCUMENTS

| | | |
|---|---|---|
| D. 243,318 | 2/1977 | Kurihara . |
| D. 255,510 | 6/1980 | Quenot . |
| D. 279,186 | 6/1985 | Tung et al. . |
| D. 279,459 | 7/1985 | On et al. . |
| D. 355,615 | 2/1995 | Atagi . |
| 4,502,226 | 3/1985 | Hung . |
| 4,760,648 | 8/1988 | Doak et al. . |

*Primary Examiner*—Vit Miska
*Attorney, Agent, or Firm*—Robert Halper

[57] ABSTRACT

A wrist watch is detachably combined with a measuring tape mounted in a casing of light weight materials.

5 Claims, 3 Drawing Sheets

SECTION A-A

SECTION A-A

SECTION A-A

COMBINED WRIST WATCH AND MEASURING TAPE

This invention pertains to a combination of a wrist watch integrated with an measuring tape.

BACKGROUND OF THE INVENTION

There have been described in the art various combinations of watches with other accessories including a watch and a measuring tape; however, nothing in the art suggests the combination of a wrist watch and a measuring tape.

Illustrative of the prior art are the following:

Design Pat. 243,318 describes an ornamental design for a wrist watch combined with a band.

Design Pat. 255,510 describes an ornamental design of a tape rule and key ring.

Design Pat. 279,186 describes an ornamental design of a combined pen, watch and radio.

Design Pat. 279,459 describes an ornamental design of a combined watch, measuring tape, and key chain.

Design Pat. 355,615 shows an ornamental design for a wrist watch, calculator and telephone index.

U.S. Pat. No. 4,502,226 relates to a combination of measuring tape and key chain.

U.S. Pat. No. 4,760,648 pertains to a marking device mounted on one side of a tape measure.

The most pertinent reference is Des. Pat. 279,459. Beside the fact that this patent is for an ornamental design, the combination is placed in one's apparel. This arrangement is not only bulky and cumbersome, but it is also inconvenient for use. Either for telling time or making a measurement, one must retrieve the device from the apparel. If a set of keys is attached to the chain, the weight bearing on the apparel such as trousers is likely to affect the wear, not to mention the nuisance and burden of carrying such a load. There is also no indication how the tape is combined with the watch and finally as an ornamental design it is of questionable value, since for the most part the device is concealed.

It is an object of this invention to use a combination of a wrist watch and measuring tape which is compact and user friendly.

It is a further object of this invention to provide a combination of wrist watch and measuring tape that can be operated from an as is position.

It is also an object of this invention to employ light weight materials that will not be unduly burdensome for the wearer.

It is still an object of this invention to provide the aforesaid combination wherein the measuring tape is detachable from the wrist watch.

SUMMARY OF THE INVENTION

The device of this invention is a conventional wrist watch integrated with a conventional measuring tape underlying the watch. The tape can be detached from the wrist watch, and the housing is made of light weight materials such as aluminum or plastic. The size of the tape measure is about the same as the watch casing.

DETAILED DESCRIPTION OF THE INVENTION

Figure 1:
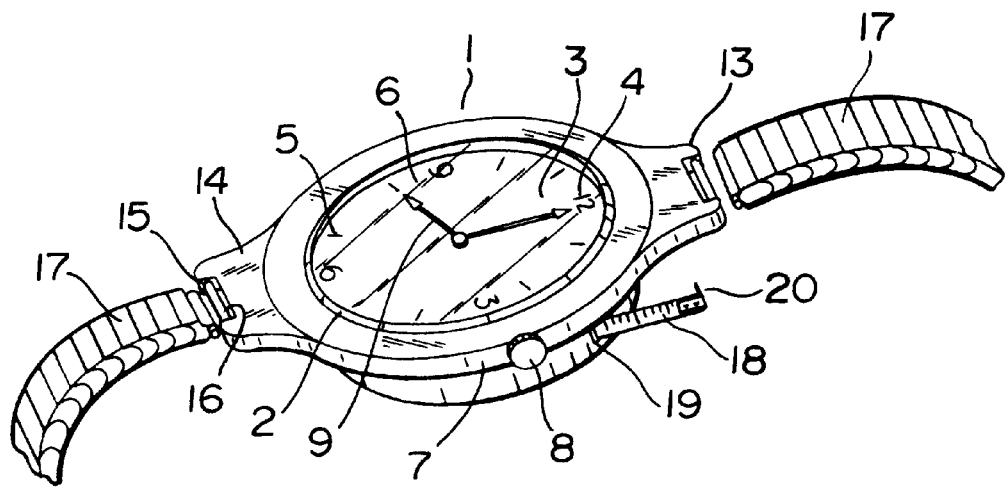
FIG. 1 is a perspective view of the wrist watch and tape measure.
Figure 2:
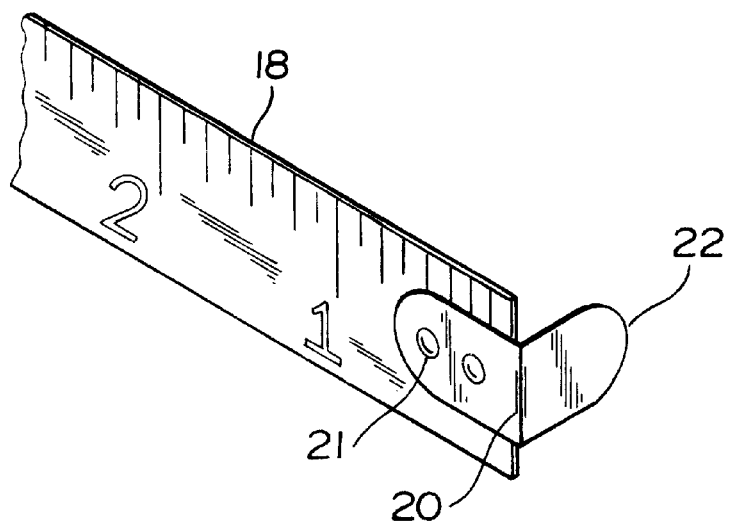
FIG. 2 is an enlarged perspective view of a part of the tape measure.
Figure 3:
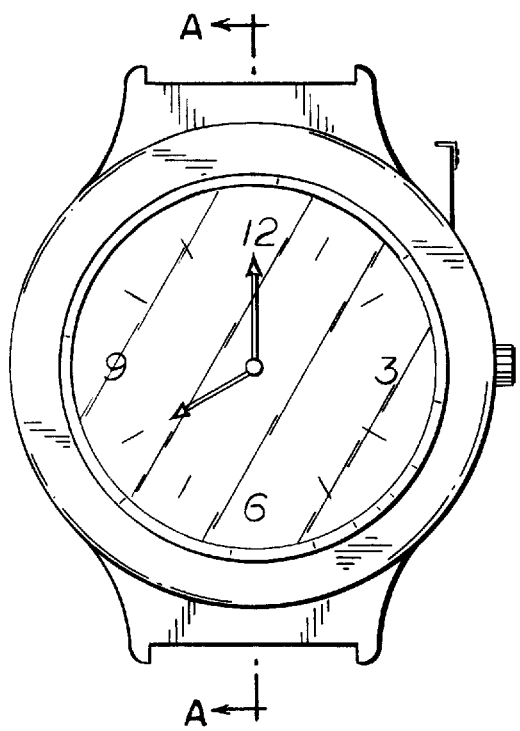
FIG. 3 is a top plan view of the combination.
Figure 4:
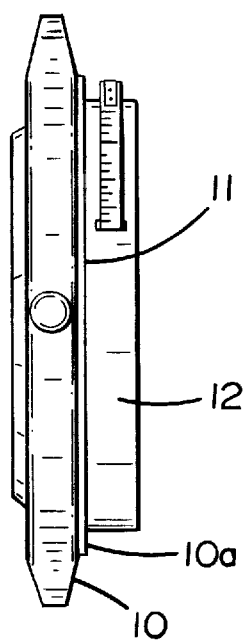
FIG. 4 is a right end view of the combination.
Figure 5:
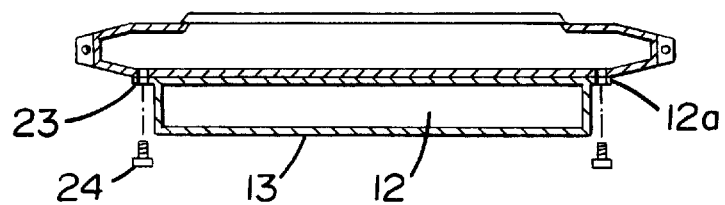
FIG. 5 is a sectional view taken on line A A of FIG. 3 showing one embodiment of attaching the watch and tape.
Figure 6:
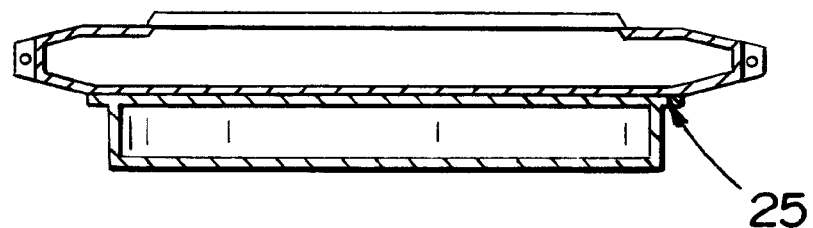
FIG. 6 is a sectional view taken on line A A of FIG. 3 showing a second embodiment for attachment.
Figure 7:
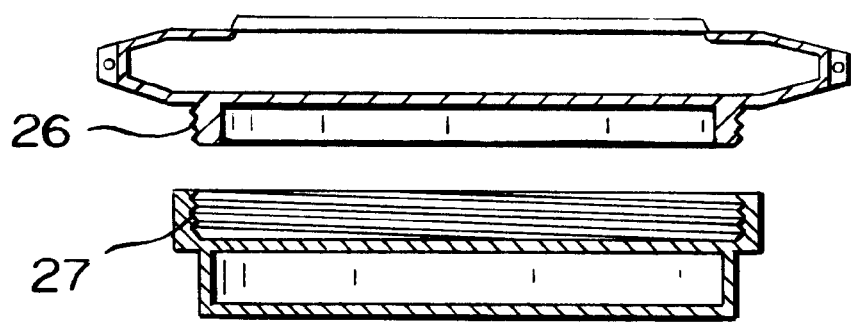
FIG. 7 is a sectional view taken on line A A of FIG. 3 showing a third embodiment for attachment.

FIG. 1 shows a conventional wrist watch 1 of generally circular shape having a front wall 2 with an indicator face 3 having a plurality of numerals 4 for showing time periods, a transparent cover 6 over the indicator face, a cylindrical housing 7 for containing the mechanical elements (not shown) for operation of the wrist watch. Attached to the cylindrical housing and in the same plane is a threaded stub 8 that can be extended to set the hands 9 on the indicator face for setting the time. The housing has a back wall 10 which tapers inwardly and contains an aperture 10a in which is placed a removable disc 11 with a smaller diameter than the back wall that fits into the aperture 10a. Attached to the back wall of the watch housing is a casing 12 having a flanged surface 12a about the same diameter or slightly larger than the diameter of the back wall. This surface abuts the back wall housing. Integral with the abutting surface is a U-shaped back plate 13 spaced from the flanged surface. The casing may be made of a light weight metal such as aluminum or a thermosetting plastic such as polyester resin or a phenol formaldehyde. Welded to the housing on each side perpendicular to the stub are two spaced arms 14 having perforations in which a pin 15 is inserted. Extending around the pins are cylinders 16 which are spaced from the pins to provide a loose fit. Secured to the cylinders is a strap 17 which can be used to fasten the watch around the wrist. The casing contains a coiled measuring tape 18 extendable from the casing through an opening 19. The end of the tape (See Enlarged FIG. 2) has a stop 20 in the form of an angle having one tapered leg 21 riveted to the tape end and the other leg 22 extending perpendicularly from leg 21. When the tape is not in use, it fits snugly within the casing. The tape casing may be fastened to the watch housing by several instrumentalities. As shown in FIG. 5, four threaded holes 23 can be drilled circumferentially around the beck wall of the watch housing. Taking the stub as a point of reference, two holes can be placed on the circumference equally spaced from the stub and two other holes can be placed circumferentially so as to be aligned with the first two holes. Four holes can then be drilled in the flanged surface of the casing that is adjacent the back wall, the holes being spaced to conform to the drilled holes in the watch back wall. Four screws 24 are then used to make the tape casing integral with the watch housing. In the embodiment shown in FIG. 6 a thin layer of epoxy resin 25 is placed on the housing back wall and the abutting surface of the casing. After several minutes a good bond is effectuated. If necessary, the bond can be removed by an organic solvent such as acetone or the like. In the embodiment of FIG. 7, the periphery of the back wall is provided with depending external threads 26 and the flanged surface of the casing adjacent the back wall is equipped with a set of internal threads 27 that mesh with the external threads on the watch housing so that when the watch and the tape are threaded together there is no undue elevation. Another way of fitting the tape casing to the watch is to use a snap fit type device wherein a circular bead can be brazed around the periphery of the watch housing and a spring type band with a groove could be fastened to the rim of the casing so that the goove of the band would snap over the bead.

The combination of wrist watch and tape is compact, neat and not unduly burdensome. The tape can be used directly without detachment of the watch band.

The invention has been described with respect to several embodiments, but it should be understood that various modifications could be made that would occur to those skilled in the art without departing from the scope of the invention as defined by the appended claims.

We claim:

1. A wrist watch combined with a measuring tape and means for detachably securing said measuring tape to said wrist watch, said measuring tape being enclosed in a casing made of light weight materials.

2. The combination of claim 1 wherein said wrist watch has a shaped housing and a stub adjacent said housing and in the same plane, said housing including a back wall with a peripheral region and said means comprises a plurality of threaded holes spaced around said peripheral region, said holes being spaced so as not to be located in the region of said stub, a casing containing a measuring tape and shaped to conform to the shape of said housing, said casing including a flanged surface abutting the back wall of said housing, and a U-shaped plate integral with said flanged surface and spaced therefrom, a plurality of threaded holes in said flanged surface spaced to be aligned with said holes in said housing and a plurality of screws to be inserted in said holes of said housing and said casing for detachably securing said tape enclosed in said casing to said wrist watch.

3. The combination of claim 1 wherein said wrist watch has a shaped housing including a back wall, a casing containing a measuring tape and shaped to conform to the shape of said housing, said casing includes an upper flanged surface closely adjacent said back wall and a U-shaped plate, integral with said flanged surface and spaced therefrom, and said means includes a layer of epoxy resin placed between said back wall and said flanged surface to detachably secure said tape enclosed in said casing to said wrist watch.

4. The combination of claim 1 wherein said wrist watch has a shaped housing including a back wall with a peripheral region, and said means comprises a set of external threads depending from said peripheral region of said back wall, a casing containing a measuring tape and shaped to conform to the shape of said housing, said casing including an upper flanged surface with internal threads in said flanged surface, a U-shaped plate integral with said flanged surface and spaced therefrom, said internal threads in said flanged surface mating with said external threads depending from said back wall so that said measuring tape enclosed in said casing is detachably secured to said wrist watch with said casing being closely adjacent said back wall of said housing.

5. The combination of claim 1 wherein said light weight materials are chosen from a group comprising plastic and aluminum.

* * * * *